United States Patent [19]
Solin et al.

[11] 3,725,638
[45] Apr. 3, 1973

[54] HEAT RADIATING ASSEMBLY AND APPARATUS FOR PERMITTING ICE BLOCKED WATER TO DRAIN OFF OF HOUSE ROOFS

[75] Inventors: Edward P. Solin, Ilion; Russell Post, Fairfield, both of N.Y.

[73] Assignee: Arctic Roof Deicing Corporation, Ilion, N.Y.

[22] Filed: June 1, 1971

[21] Appl. No.: 148,602

[52] U.S. Cl. ..................219/213, 219/538, 219/549
[51] Int. Cl. ..............................................H05b 1/00
[58] Field of Search......219/213, 345, 538, 544, 546, 219/548, 549; 168/47; 176/343.5; 338/214

[56] References Cited

UNITED STATES PATENTS

| | | | |
|---|---|---|---|
| 2,800,560 | 7/1957 | Schrotter et al. | 338/214 |
| 3,153,140 | 10/1964 | Theodore et al. | 219/549 |
| 2,710,909 | 6/1955 | Logan et al. | 338/214 X |
| 2,111,251 | 3/1938 | Spilsbury | 219/213 X |
| 3,214,571 | 10/1965 | Indoe | 219/544 |
| 3,324,280 | 6/1967 | Cheney et al. | 219/544 |
| 2,507,039 | 5/1950 | Miller | 219/213 |
| 3,141,955 | 7/1964 | Culpepper | 219/213 |
| 2,699,484 | 1/1955 | Michaels | 219/213 |
| 3,364,335 | 1/1968 | Palatini et al. | 219/213 |

*Primary Examiner*—C. L. Albritton
*Attorney*—Harry M. Weiss

[57] ABSTRACT

A heat radiating assembly and an apparatus using a plurality of heat radiating assemblies for melting ice on the roof thereby permitting ice blocked water to drain off of the roof. The heat radiating assembly comprises a flexible heat generating element, a shielding element for protecting the flexible heat generating element and for radiating heat produced by the flexible heat generating element, and an electric current source for heating up the flexible heat generating element. The roof ice melting apparatus utilizes a plurality of heat radiating assemblies with each one being spaced from the others and each one extends inwardly and upwardly from at least one roof edge. When heated up, the heat radiating assemblies of the roof ice melting apparatus create water draining channels to permit ice blocked water to drain off the roof due to melting of the ice located adjacent each heat radiating assembly.

22 Claims, 12 Drawing Figures

PATENTED APR 3 1973 3,725,638

TEMPERATURE CONTROLLED SWITCH

INVENTORS
EDWARD P. SOLIN
RUSSELL POST
BY Harry M Weiss
ATTORNEY

3,725,638

HEAT RADIATING ASSEMBLY AND APPARATUS FOR PERMITTING ICE BLOCKED WATER TO DRAIN OFF OF HOUSE ROOFS

FIELD OF THE INVENTION

This invention generally relates to heat radiating assemblies and snow and ice melting apparatus and, more particularly, to all weather operating heat radiating assemblies and roof ice melting apparatus for draining ice blocked water off of house roofs.

BACKGROUND OF THE INVENTION

A constant problem plaguing people living in houses located in areas which have cold winters (where outside temperatures drop below the freezing point of 32° F) is that ice build up on the edge portions of their roofs prevents melted water from flowing or draining off the roofs.

Most houses are conventionally built with the edges of the roof (on both sides of the house) overhanging the main frame of the house. This general type of house construction employing a roof extending beyond the frame of the house has the practical value of providing some rain shielding for the main house frame. However, during the cold winter period the extended portion of the roof that overlaps the main house frame becomes a serious liability and detriment to the home owner living in a cold winter climate.

The large portion of the roof located above the main frame of the house is generally heated somewhat due to the natural physical effect of the heat permeating up from the warmer house interior. This roof heating effect from the heat generated within the house alone or together with additional roof heating caused by the sun (including sun heat reflected by the roof exterior surface) melts snow and/or ice that is located on this large roof portion. However, the extended or overlap roof portion, which is not directly over the main house frame, is not heated very well by heat rising from the interior of the house and hence, tends to freeze into ice any melted snow or ice water coming down the roof and reaching this extended or overlap roof portion. Thus, a build up of ice occurs on this extended or overlap roof portion to a level high enough to create a cavity effect with one wall being formed by the ice build up on the extended roof portion. As a result of this ice wall being formed, melted ice or snow water coming down from the rest of the roof is not permitted to roll off the roof, but is blocked by the cavity wall. The water in the cavity starts to build up and moves back up the roof to the level of the height of the ice wall formed on the extended roof portion. This back up water goes under the roof shingles and creates water leakage problems for the home owner due to the ability of this back up water to find openings in the roof.

While a great deal of thought has been given to this problem, no practical solutions have been developed to relieve the home owner living in a cold winter climate from the annoyance and damages caused by leaks coming through the roof of his house. In some instances, ceilings have been known to collapse under the build up of water created by leaking roofs. One proposed solution to this roof leakage problem was to run an electric conductor or cable on the roof which was heated up by electric current to melt roof ice, however, this solution was not effective because of the danger of fire if the cable or conductor got too hot and because snow and ice movement on the roof caused the cables or conductors to be pulled completely or partially off the roof.

A need existed for the development of a technique, assembly or apparatus that would solve the ice build up problem, but would be able to sustain snow and ice movement on the roof and not be a fire hazard to the home owner. Furthermore, the assembly or apparatus that was needed to solve this problem had to be able to withstand the substantial variations in temperature that were required of electric heating units that were employed for this roof ice buildup problem. Additionally, any electric heating units desirably had to have the additional features of being quickly assembled, radiate sufficient heat, relatively inexpensive, rugged construction, dependable operation, and permit secure attachment to house roofs.

SUMMARY OF THE INVENTION

Accordingly, it is an object of this invention to provide an improved heat radiating assembly.

It is another object of this invention to provide an improved apparatus for permitting ice blocked water to drain off of house roofs.

In accordance with one embodiment of this invention, a heat radiating assembly is provided which comprises a flexible heat generating element. The flexible heat generating element has an outer, flexible, moisture resistant, temperature variation insensitive, protective sheath and at least one resistance wire located within the sheath. Shielding and heat radiating means are provided for protecting the flexible heat generating element and for radiating heat produced by the flexible heat generating element. Preferably, the shielding and heat radiating means is a metal sheath. Electric current source means are electrically connected to the resistance wire for heating the wire and for establishing this wire as a heat source for the shielding and heat radiating means. Additionally, temperature controlled switch means is electrically connected between the electric current source means and the resistance wire of the flexible heat generating element for controlling the passing of current to the resistance wire depending upon the temperature external to the temperature controlled switch means. Preferably, the outer, flexible protective sheath of the flexible heat generating element is made of silicone rubber.

In accordance with another embodiment of this invention, an electric heat generating apparatus is provided for melting ice and permitting ice blocked water to drain off of a house roof. The apparatus comprises a plurality of heat radiating assemblies attached to the house roof. Each of the plurality of heat radiating assemblies is spaced from each other and extend inwardly and upwardly from at least one edge of the roof. Electric current source means are electrically connected to each of the plurality of heat radiating assemblies for permitting each of the plurality of heat radiating assemblies the capability of melting ice located adjacent to each of the plurality of heat radiating assemblies thereby enabling ice blocked water located on the roof to drain off the roof through melted channels created by each of the plurality of heat radiating assemblies.

The foregoing and other objects, features and advantages of the invention will be apparent from the following, more particular description of the preferred embodiments of the invention, as illustrated in the accompanying drawings.

DESCRIPTION

Figure 1:
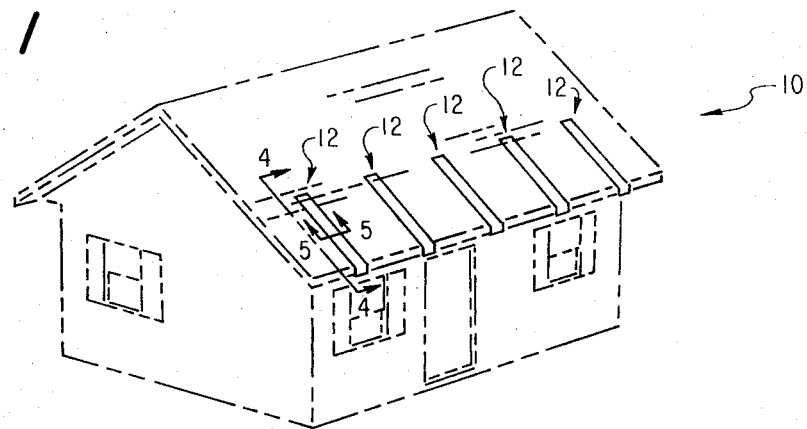
FIG. 1 is a perspective view of a house showing a plurality of heat radiating assemblies mounted on the roof and used as an apparatus for melting ice thereon.

Referring to FIG. 1, reference numeral 10 generally designates a house (shown in phantom lines) having a roof ice melting apparatus thereon shown by a number of heat radiating assemblies 12 mounted near the bottom edge portion of the roof. As can be seen with reference to FIG. 1, each one of the plurality of heat radiating assemblies 12 is spaced from the others and, preferably, arranged in a parallel configuration. The spacing between the heat radiating assemblies 12 can be varied as desired to provide the most efficient roof ice heating arrangement depending upon the particular winter climate the house is in, the material of the roof, the amount of heat radiated by each heat radiating assembly 12, the size (or dimensions) of each heat radiating assembly 12, etc. Preferably, each heat radiating assembly 12 is from about 3 feet to about 5 feet in length. As can be seen from FIG. 1, each heat radiating assembly 12 extends inwardly and upwardly from the edge of the roof of the house 10.

Figure 2:
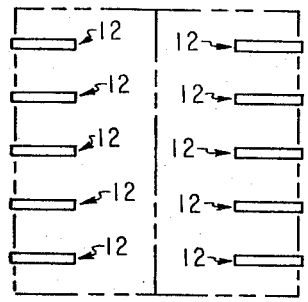
FIG. 2 is a top view of the roof of the house of FIG. 1 showing a number of heat radiating assemblies on both sides of the roof.
Figure 3:
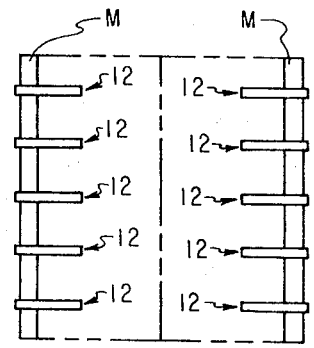
FIG. 3 is a top view similar to FIG. 2 showing a metal strip on two ends of the roof which is in contact with a number of heat radiating assemblies located on both sides of the roof.

Referring to FIG. 2, both edges of the roof of the house 10 of FIG. 1 are shown having the heat radiating assemblies mounted thereon in the manner shown in FIG. 1. FIG. 3 is similar to FIG. 2, but shows a metal strip M such as of aluminum (having a width of up to several feet) mounted and running along the edge portion of each side of the roof. Each metal strip M is, preferably, in physical contact with each of the heat radiating assemblies 12 located on the side of the roof associated with each metal strip M. In this manner, heat produced by each of the heat radiating assemblies 12 warms up each of the metal strips M thereby further enhancing melting of snow and ice located near the roof edges. Thus, the build up of ice over the cold (overlap or extended) portion of the roof is prevented by the combined use of the metal strips M and the heat radiating assemblies associated therewith.

Figure 4:
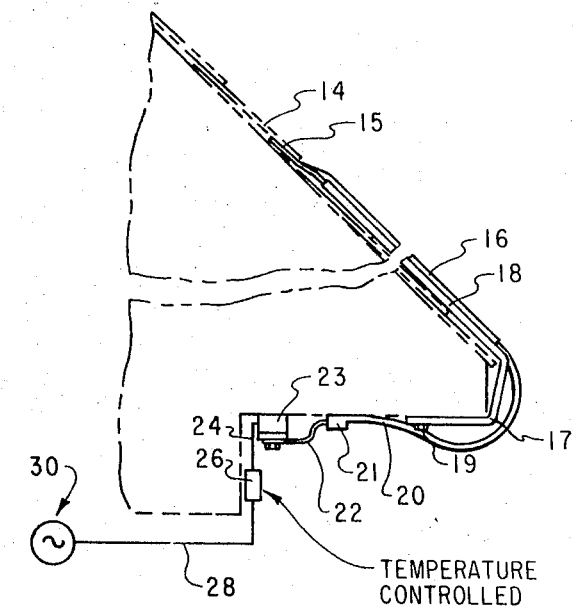
FIG. 4 is a view taken along the lines 4—4 of FIG. 1 showing the mounting of a heat radiating assembly on the roof and its connection to a current source through a temperature controlled switch.

Referring to FIG. 4, one of the heat radiating assemblies of FIG. 1 is shown attached to the house roof. A roof shingle 14 (shown in phantom) is located on top of one end 15 of the heat radiating assembly. This is one illustrative form of attachment and other ways of mounting the heat radiating assembly on the roof can be used. Preferably, one shingle (14 for example) is lifted and the end 15 of the heat radiating assembly is placed under the shingle and nailed or screwed into the, for example, plywood located beneath the shingle. Then the shingle is lowered over and in contact with the end 15 and, if necessary, firmly attached to the roof.

Figure 5:
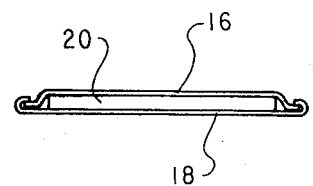
FIG. 5 is a sectional view of the heat radiating assembly as taken along the lines 5—5 of FIG. 1.

The heat radiating assembly comprises a shield having preferably an outer section 16 and an inner section 18 (see FIG. 5 also). The heat radiating assembly also contains a flexible heat generating element 20 (see FIG. 5 also) which is located between the outer section 16 and the inner section 18. In FIG. 4, the outer or upper section 16 is shown ending substantially near the edge of the roof whereas the inner or bottom section 18 closely follows the contour around the roof edge as shown by reference numeral 17. This bottom or inner section 18 is fastened to the soffit by means of a screw or nail 19 thereby securely holding the heat radiating assembly on the roof of the house at only two points (beneath the shingle 14 and under the soffit). The flexible heat generating element 20 is shown looping around the roof edge to a point where it is attached, for example, by adhesive or clamping means, to the bottom of the soffit. This loop of the heat generating element 20, because it is hot and the last thing the melted ice water touches going off the roof, is important because it serves to prevent any icicles from being formed at the roof edge where each heat radiating assembly is located.

A terminal point 21 of the flexible heat generating element 20 is the portion where electric current is supplied to the flexible heat generating element 20. From the terminal point 21, current is fed to the resistance wire or wires that is embedded within and throughout the flexible heat generating element 20. A conductor or electric wire or lead 22 having a plug on the end thereof forms part of the flexible heat generating element 20 and serves to electrically connect it up to an electric plug strip or molding 23 which, preferably, runs along under the soffit and serves to permit a current source to be applied to each of the heat radiating assemblies. If desired, an individual current source can be applied to each heat radiating assembly by providing individual outlets for each plug of the flexible heat generating element 20. In the embodiment of FIG. 4, a temperature controlled switch 26 is shown electrically connected by means of conductive lead or wire 28 to an alternating current source 30 which is connected to or part of the house current. In this manner, the temperature controlled switch 26 serves to electrically open or close the circuit thereby respectively preventing or permitting current to flow to each of the heat radiating assemblies connected to the common plug strip on molding 23. Thus, depending upon the temperature setting of the temperature controlled switch 26, the switch 26 closes or opens in relation to the external temperature at the switch 26. For example, it may be desirable to set the temperature controlled switch 26 to close or pass current at an external temperature of about 35° F which is slightly above the 32° F freezing point in order to insure that the heat radiating assemblies would turn on and warm up in time to prevent ice build up on the roof. The heat radiating assemblies in their parallel configuration on the roof serve to, when heated up, create liquid channels of melted ice thereby permitting any water build up on the roof to gravity flow or drain thereoff because of the drainage channels provided by the heated up heat radiating assemblies. Thus, while the heat radiating assemblies may not and probably will not melt all the ice between each of the heat radiating assemblies because of spacing therebetween, the water flow channels provided by the heated up heat radiating assemblies drain all pockets of water off of the roof thereby preventing any possibility of water back flow under the roof shingles which causes the undesirable house leakage problems described previously.

The flexible heat generating element 20 or the heat radiating assembly preferably is about one to about twelve inches wide depending upon the heating that is desired. Preferably, a two or three inch width is more desirable. In one example, using a five foot long heat radiating assembly that has a flexible heat generating element about three inches wide provided, with the use of a 110 Volt line and a current of 1.8 Amps, 180 Watts of energy. Each heat radiating assembly can provide, if desired, a heating temperature of 100° F even though the outside temperature is at 0° F. The heating temperature provided by each heat radiating assembly can be varied depending upon the external temperature, material construction of the roof, etc.

The flexible heat generating element is preferably a RAMAFLEX (trademark of the Rama Corporation of San Jacinto, Calif.) type of flexible heating element as described in their Hot Line Catalogue (1970 Copyright). This flexible heating element is constructed by utilizing a resistance element that is made by winding one or more fine nickel alloy wires around a glass string. A flexible outer sheath is made by laminating the resistance element between two sheets of glass cloth which have been impregnated with silicone rubber. The sheath is vulcanized under pressure to form a uniform, flexible, rubber sheath. Since the resistance element is imbedded in the rubber sheath, the chances of having a fire because of shorting is substantially eliminated. Furthermore, the outer flexible sheath is moisture resistant which is important to protect the resistant element since the heat radiating assembly is constantly exposed to melted ice or snow during the winter. Additionally, the rubberized sheath of the flexible heating element 20 is substantially temperature variation insensitive which is critical in avoiding destructive cracking under wide ranges of temperature to which the element 20 is subjected.

The upper section 16 and the lower section 18 are preferably made of metal such as aluminum which can be extruded to the shapes desired. Thus, the flexible heating element 20 is placed between metal sections 16 and 18 which can be rapidly assembled together to provide the heat radiating assembly. Besides aluminum, copper, stainless steel or galvanized metal can be used for the sections. The metal sections 16 and 18 not only protect and shield the flexible heat generating element 20, but serve as a heat radiating means by radiating the heat generated by the flexible heat generating element 20. While the sections 16 and 18 are preferably of metal, it may be desirable in some circumstances or for cost reasons to use non-metallic sections made of plastic, Teflon or Nylon.

Figure 5A:
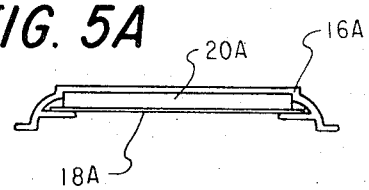
FIG. 5A is a sectional view similar to FIG. 5, but of another structural configuration of a heat radiating assembly.

FIG. 5A is similar to FIG. 5 and illustrates another form of heat radiating assembly structure with the same reference numerals as used in FIG. 5 to designate the same parts with the addition of the letter A to each numeral. In this embodiment, there are two metal sections 16A and 18A except that the metal section 16A has two legs which rest against the roof providing an air space beneath the metal section 18A on which is located the flexible heat generating element 20A. This type of structure is preferable also because it can be extruded relatively inexpensively out of aluminum having a thickness of about 0.060 inch. The flexible heat generating element 20A or 20 (FIG. 5) has a thickness which can vary from about 0.015 inch to about 0.055 inch. The metal section 18 (FIG. 5) or 16A (FIG. 5A) have curved portions to respectively hold the end portions of the relatively flat metal section 16 (FIG. 5) or 18A (FIG. 5A).

Figure 6:
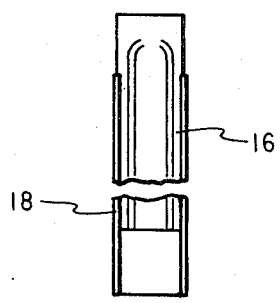
FIG. 6 is an enlarged, more detailed view of one of the heat radiating assemblies of FIG. 1 looking at it from the top.
Figure 7:
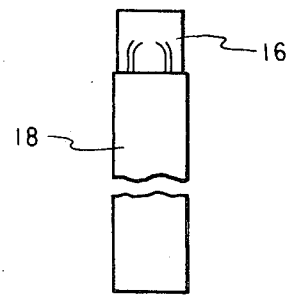
FIG. 7 is an enlarged, more detailed view of one of the heat radiating assemblies of FIG. 1 looking at it from the bottom.

FIG. 6 is an enlarged view showing the top metal section 16 (See FIG. 5) held by the bottom metal section 18. FIG. 7 is an enlarged view from the opposite direction showing the bottom metal section 18 and the top metal section 16.

Figure 8:
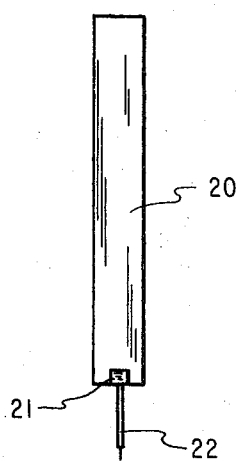
FIG. 8 is a front elevational view of the flexible heat generating element of one of the heat radiating assemblies of FIG. 1.
Figure 9:
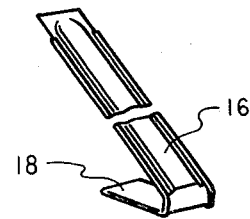
FIG. 9 is an enlarged, more detailed perspective view of one of the heat radiating assemblies of FIG. 1 with a bend therein for attaching to one edge of the house roof.

FIG. 8 is an enlarged view of the flexible heat generating element 20 (see FIG. 4). FIG. 9 is a perspective view of the heat radiating assembly of FIG. 4 (without the flexible heat generating element 20).

Figure 11:
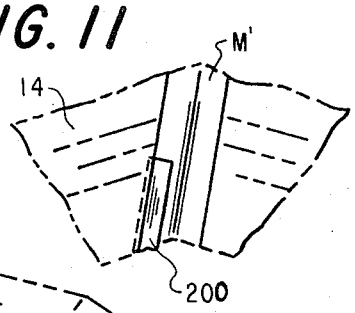
FIG. 11 is an enlarged view showing an arrangement similar to that of FiG. 10, but showing the heat radiating assembly located on one side of the metal channel.
Figure 10:
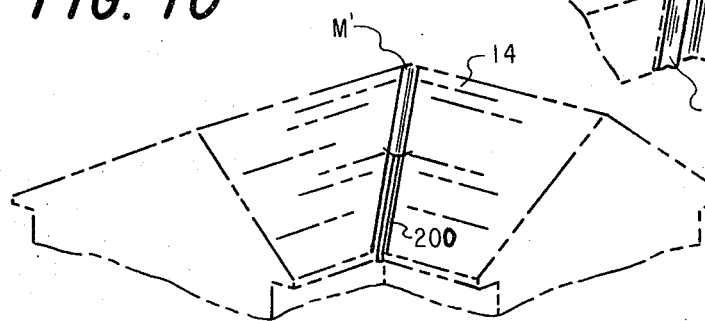
FIG. 10 is a perspective view showing the location of one of the heat radiating assemblies of FIG. 1 in a metal, water directing, channel on a house roof.

FIG. 10 illustrates another embodiment where a heat radiating assembly 200 is located in a metal water directing, channel M' located on a house roof. The heat radiating assembly is attached to the roof by two wires, for example, running from the end of the assembly 200 to beneath two shingles located on the roof. FIG. 11 is an enlarged view similar to that of FIG. 10, but in this example the heat radiating assembly 200 is located on one side of the metal channel M' rather than in the center thereof as shown in FIG. 10. In the FIG. 11 embodiment, one edge of the heat radiating element 200 is held by the edge or edges of one or more roof shingles. The arrangement of either FIG. 10 or FIG. 11 permits the heat radiating assembly to heat up the metal channel M' thereby permitting ice to melt thereon and the melted water to flow off the roof.

While the invention has been particularly shown and described with reference to the preferred embodiments thereof, it will be understood by those skilled in the art that the foregoing and other changes in the form and details may be made therein without departing from the spirit and scope of the invention.

We claim:

1. An electric heat generating apparatus for melting ice and permitting ice blocked water to drain off of a house roof comprising, in combination, a plurality of heat radiating assemblies attached to said house roof, each of said plurality of heat radiating assemblies being spaced from each other and extending inwardly and upwardly from at least one edge of said roof; each of said heat radiating assemblies comprising
    a flat flexible heat generating element having an outer, flexible, moisture resistant, temperature variation insensitive, protective sheath, said heat generating element having at least one resistance wire located within said sheath;
    flat, rigid, shielding and heat radiating means for protecting said flexible heat generating element and for radiating heat produced by said flat flexible heat generating element; and
    electric current source means being electrically connected to said resistance wire of said flat flexible heat generating element;
    said electric current source means electrically connected to each of said plurality of heat radiating assemblies for permitting each of said plurality of heat radiating assemblies the capability of melting ice located adjacent to each of said plurality of heat radiating assemblies thereby enabling ice blocked water located on said roof to drain off through melted channels created by each of said plurality of heat radiating assemblies.

2. The apparatus of claim 1 wherein each of said plurality of heat radiating assemblies having only one end portion attached onto said roof.

3. The apparatus of claim 2 wherein said one end portion of each of said plurality of heat radiating assemblies being attached to said roof underneath a roof shingle.

4. The apparatus of claim 1 wherein each of said plurality of heat radiating assemblies being substantially parallel with respect to each other.

5. The apparatus of claim 1 including a metal roof edge element running along said one edge of said roof and in contact with each of said plurality of heat radiating assemblies.

6. The apparatus of claim 1 wherein each of said plurality of heat radiating assemblies being spaced from each other and extending inwardly and upwardly from both lower edges of said roof.

7. The apparatus of claim 1 wherein each of said plurality of heat radiating assemblies being from about 3 feet to about 5 feet in length.

8. The apparatus of claim 1 wherein each of said plurality of heat radiating assemblies being from about 1 to about 12 inches in width.

9. The apparatus of claim 7 wherein each of said plurality of heat radiating assemblies being from about 1 to about 12 inches in width.

10. The apparatus of claim 1 wherein said plurality of heat radiating assemblies being electrically connected together.

11. The apparatus of claim 10 including temperature controlled switch means electrically connected between said electric current source means and said plurality of heat radiating assemblies for turning said assemblies on or off depending on the external temperature.

12. The apparatus of claim 1 wherein said outer, flexible sheath of said flexible heat generating element comprising a rubberized layer.

13. The apparatus of claim 12 wherein said rubberized layer is a silicone rubber layer.

14. The apparatus of claim 1 wherein said shielding and heat radiating means comprises a metal sheath surrounding said flexible heat generating element.

15. The apparatus of claim 14 wherein said metal sheath comprises a first metal section and a second metal section, said flexible heat generating element being located between said first metal section and said second metal section.

16. The apparatus of claim 15 wherein said first metal section being substantially flat, said second metal section having a first curved portion and a second curved portion, one side end portion of said first metal section being held by said first curved portion of said second metal section, the other side end portion of said first metal section being held by said second curved portion of said second metal section.

17. The apparatus of claim 1 wherein said shielding and heat radiating means comprises a non-metallic sheath surrounding said flexible heat generating element.

18. The apparatus of claim 17 wherein said non-metallic sheath is made of plastic.

19. The apparatus of claim 17 wherein said non-metallic sheath is made of Teflon.

20. The apparatus of claim 1 wherein said outer, flexible sheath of said flexible heat generating element comprising a rubberized layer, said shielding and heat radiating means comprises a metal sheath surrounding said rubberized layer.

21. The apparatus of claim 1 including a metal channel strip extending inwardly and upwardly from said edge of said roof, one of said plurality of heat radiating assemblies being in contact with said metal channel strip.

22. The apparatus of claim 1 wherein said outer, flexible sheath of said flexible heat generating element comprising a silicone rubber layer, said shielding and heat radiating means comprises a metal sheath surrounding said silicone rubber layer, one end of said metal sheath being attached onto said roof, each of said plurality of heat radiating assemblies being from about 3 feet to about 5 feet in length and from about 1 to about 12 inches in width.

* * * * *